United States Patent
Reichenbach et al.

(10) Patent No.: US 9,868,252 B2
(45) Date of Patent: Jan. 16, 2018

(54) CONTAINER ASSEMBLY AND METHOD FOR MAKING ASSEMBLY

(75) Inventors: Judith Reichenbach, Pompton Plains, NJ (US); Jay White, Columbus, NE (US); Dimitrios Manoussakis, Wyckoff, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 13/524,422

(22) Filed: Jun. 15, 2012

(65) Prior Publication Data

US 2012/0248107 A1    Oct. 4, 2012

Related U.S. Application Data

(62) Division of application No. 12/499,534, filed on Jul. 8, 2009, now Pat. No. 8,220,128, which is a division of application No. 10/771,679, filed on Feb. 3, 2004, now Pat. No. 7,574,789.

(60) Provisional application No. 60/444,404, filed on Feb. 3, 2003.

(51) Int. Cl.
| | |
|---|---|
| *B29C 65/00* | (2006.01) |
| *B29C 65/56* | (2006.01) |
| *B65D 23/08* | (2006.01) |
| *B01L 3/00* | (2006.01) |
| *B21D 39/04* | (2006.01) |

(52) U.S. Cl.
CPC .......... *B29C 66/545* (2013.01); *B01L 3/5082* (2013.01); *B29C 65/565* (2013.01); *B65D 23/0842* (2013.01); *B65D 23/0885* (2013.01); *B01L 2200/12* (2013.01); *B01L 2300/0854* (2013.01); *B21D 39/04* (2013.01); *Y10T 29/4987* (2015.01); *Y10T 29/49863* (2015.01); *Y10T 29/49872* (2015.01); *Y10T 29/49876* (2015.01); *Y10T 29/49879* (2015.01); *Y10T 29/49895* (2015.01)

(58) Field of Classification Search
CPC ................. B29C 65/565; B29C 66/545; B01L 2300/0854; B01L 3/5082; B01L 2200/12; B65D 23/0842; B65D 23/0885; B21D 39/04; Y10T 29/49879
USPC .................. 220/23.87, 495.04, 23.83, 366.1; 215/12.1, 10; 428/36.9, 36.91
See application file for complete search history.

(56) References Cited

U.S. PATENT DOCUMENTS

| | | | |
|---|---|---|---|
| 2,591,578 A | 4/1952 | McNealy et al. | |
| 3,610,455 A | * 10/1971 | Greenhalgh et al. | ........ 215/12.1 |
| 3,673,673 A | 7/1972 | Wiltshire | |

(Continued)

FOREIGN PATENT DOCUMENTS

| | | |
|---|---|---|
| EP | 0245994 A2 | 11/1987 |
| GB | 0735921 | 7/1998 |

(Continued)

*Primary Examiner* — Jeffrey Allen
*Assistant Examiner* — Jennifer Castriotta
(74) *Attorney, Agent, or Firm* — The Webb Law Firm

(57) ABSTRACT

The present invention is directed to a method of assembling a container including an inner tube contained within an outer tube. The method includes providing an outer tube, providing a spacing element adjacent the open top of the outer tube and inserting an inner tube within the outer tube. The spacing element provides for venting of air from between the inner and outer tubes through the top of the container during assembly thereof.

7 Claims, 16 Drawing Sheets

(56) References Cited

U.S. PATENT DOCUMENTS

| | | |
|---|---|---|
| 3,781,155 A | 12/1973 | Wiltshire |
| 3,807,955 A | 4/1974 | Note, Jr. et al. |
| 4,144,631 A | 3/1979 | Fujio |
| 4,578,588 A | 3/1986 | Galkin |
| 4,738,827 A | 4/1988 | Pierotti |
| 4,746,017 A | 5/1988 | Howard et al. |
| 4,756,446 A | 7/1988 | Gen et al. |
| 4,771,911 A | 9/1988 | Morony et al. |
| 4,830,217 A | 5/1989 | Dufresne et al. |
| 4,919,985 A | 4/1990 | Asai et al. |
| 4,942,966 A | 7/1990 | Kemp |
| 4,983,238 A | 1/1991 | Yoshida et al. |
| 5,000,804 A | 3/1991 | Nugent |
| 5,019,243 A | 5/1991 | McEwen et al. |
| 5,055,258 A | 10/1991 | Brodt et al. |
| 5,096,062 A | 3/1992 | Burkardt et al. |
| 5,158,750 A | 10/1992 | Finicle |
| 5,160,704 A | 11/1992 | Schluter |
| 5,167,929 A | 12/1992 | Korf et al. |
| 5,197,602 A * | 3/1993 | Biesecker et al. ............ 206/514 |
| 5,316,170 A | 5/1994 | Brown |
| 5,341,956 A | 8/1994 | Van Brocklin |
| 5,519,931 A | 5/1996 | Reich |
| 5,598,942 A | 2/1997 | Cowie |
| 5,816,431 A | 10/1998 | Giannopoulos |
| 5,833,928 A | 11/1998 | Ratajczak et al. |
| 5,871,700 A | 2/1999 | Konrad |
| 6,000,571 A | 12/1999 | Brooks et al. |
| 6,010,024 A | 1/2000 | Wang |
| 6,015,063 A | 1/2000 | Poliquin |
| 6,189,755 B1 | 2/2001 | Wakefield |
| 6,296,138 B1 | 10/2001 | Hannah et al. |
| 6,308,846 B1 | 10/2001 | Muller |
| 6,354,452 B1 * | 3/2002 | DeSalvo ............... B01L 3/5082 215/12.1 |
| 6,651,835 B2 | 11/2003 | Iskra |
| 7,252,207 B2 | 8/2007 | Liao |
| 7,273,155 B1 | 9/2007 | Gray |
| 7,574,789 B2 | 8/2009 | Reichenbach et al. |
| 7,578,977 B2 | 8/2009 | Swenson |
| 7,591,060 B2 | 9/2009 | Shalit |
| 2002/0011492 A1 * | 1/2002 | Iskra .......................... 220/23.87 |
| 2002/0104840 A1 | 8/2002 | Iskra |
| 2004/0079753 A1 | 4/2004 | Reichenbach et al. |
| 2004/0222223 A1 | 11/2004 | Swenson |

FOREIGN PATENT DOCUMENTS

| | | |
|---|---|---|
| JP | 3634438 B2 | 11/1996 |
| JP | 8289881 A | 11/1996 |
| WO | 9517253 | 6/1995 |

\* cited by examiner

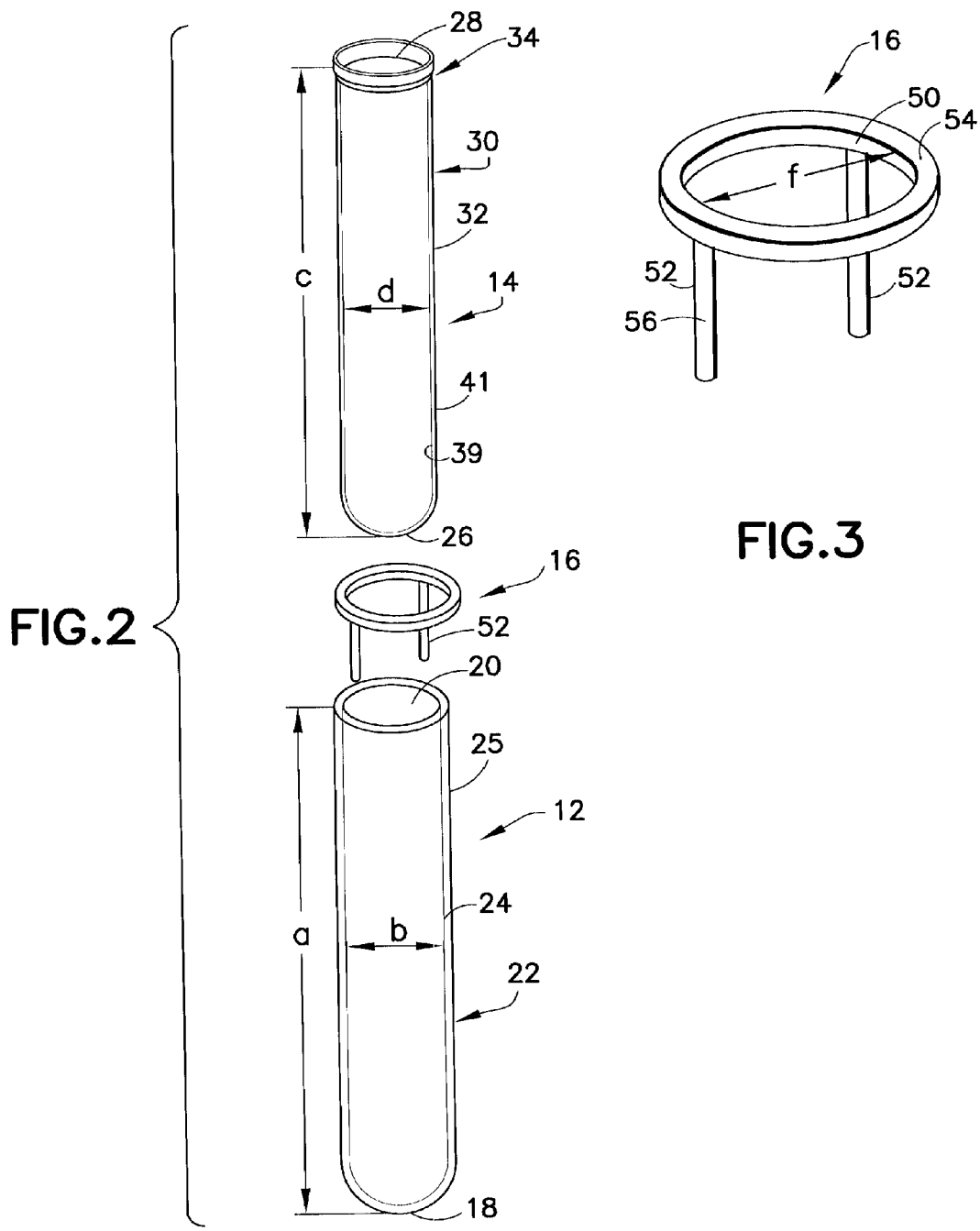

CONTAINER ASSEMBLY AND METHOD FOR MAKING ASSEMBLY

CROSS REFERENCE TO RELATED APPLICATIONS

This application is a divisional of U.S. patent application Ser. No. 12/499,534 filed Jul. 8, 2009, which is a divisional of U.S. patent application Ser. No. 10/771,679 filed Feb. 3, 2004, which issued as U.S. Pat. No. 7,574,789 on Aug. 18, 2009, which in turn claims priority to U.S. Provisional Patent Application No. 60/444,404, filed Feb. 3, 2003, the entire disclosure of each of which are herein incorporated by reference.

BACKGROUND OF THE INVENTION

1. Field of the Invention

The present invention relates to a container assembly and method of manufacture thereof. More particularly, the present invention is directed to a method of assembling a container having an inner tube contained within an outer tube.

2. Description of Related Art

Glass collection containers have historically been used for collection of body fluids such as blood and urine. For example, glass inherently provides excellent vacuum retention for evacuated tubes, as well as excellent moisture retention for collection tubes containing liquid additives.

However, the medical industry has been transitioning from glass to plastic for a variety of reasons including the increased safety of a plastic tube, which tolerates impact stresses without breaking. Unfortunately, no single plastic material that is commercially acceptable from a cost and performance perspective exhibits the beneficial properties of glass. For example, plastic tubes tend to exhibit either good vacuum retention or good moisture retention, but no single plastic material exhibits both properties to a degree useful for evacuated collection tubes.

Various solutions to this problem have been devised. These include, for example, the tube-in-tube configurations described in U.S. Pat. Nos. 6,354,452 and 5,871,700, and U.S. patent application Ser. Nos. 09/933,653 and 10/114,542, the disclosures of which are hereby incorporated by reference. Such tube-in-tube configurations typically involve an inner tube positioned within an outer tube to form a container, with each of the tubes providing distinct properties to the container. More particularly, one of the tubes may provide a water vapor barrier to the container, while the other tube may provide a gas bather to the container, thereby effectively forming a container which has both gas barrier and water vapor barrier properties.

For example, U.S. Pat. No. 6,354,452 describes a container assembly that includes an inner tube formed from a plastic that is substantially inert to bodily fluids and an outer tube that is formed from a different plastic. Collectively, the container assembly is useful for providing an effective barrier against gas and water permeability in the assembly and for extending the shelf-life of the container assembly, especially when used for blood collection. However, such a close nesting arrangement of the containers may create difficulties in the assembly process. For example, insertion of one container into another container can create some inherent manufacturing difficulties, such as the force created and exerted by trapped air upon insertion of the inner container into the outer container. Other difficulties may include the techniques by which the tubes can be held together securely and avoidance of leakage from the inner tube into the space between the two tubes.

Accordingly, a need exists for a method of assembling a container including an inner tube contained within an outer tube that eliminates the presence of a pressure gradient exerted by trapped air during the insertion of an inner container into an outer container.

SUMMARY OF THE INVENTION

The present invention provides a method of assembling a container including inserting an inner tube within an outer tube, with the use of a spacing element for venting of air between the two tubes to atmospheric pressure during insertion of the inner tube within the outer tube. The outer tube includes a closed bottom, an open top and a side wall extending therebetween, defining an inner surface and an outer surface. The inner tube also includes a closed bottom, an open top and a side wall having an inner and outer surface extending therebetween. A spacing element is provided adjacent the open top of the outer tube. The spacing element includes a central opening extending therethrough and at least one extending member extending within the open top of the outer tube. In the method of assembly, the inner tube is inserted within the outer tube, such that the spacing element extends between the inner surface of the outer tube and the outer surface of the inner tube. As such, any air between the two tubes is vented to atmospheric pressure during insertion of the inner tube within the outer tube.

More particularly, the inner tube may be inserted through the central opening of the spacing element, with the extending member of the spacing element trapped between the outer tube and the inner tube. When the inner tube is advanced within the outer tube, the extending member causes the wall of either the inner tube or the outer tube to at least partially deform to permit any air trapped between the two tubes to escape to atmospheric pressure. Accordingly, any pressure build-up between the two tubes can be effectively eliminated. Desirably, the inner tube is constructed of a material that is softer than the outer tube and the extending member of the spacing element is constructed of a material that is at least as hard as a material forming the outer tube, such that the softer inner tube will deform during insertion within the outer tube, based on the interference from the extending member between the outer tube and the inner tube.

Desirably, at least a portion of the inner tube has an external diameter which is smaller than an internal diameter of the outer tube to form an annular gap therebetween. Also, the side wall of the inner tube is preferably shorter than the side wall of the outer tube, and is preferably flared outwardly adjacent the open top of the inner tube for sealing and supporting engagement with the side wall of the outer tube.

The spacing element may further include a rim associated with the open top of the outer tube. In particularly desirable embodiments, the spacing element may include at least two extending members equally spaced on opposing sides of the spacing element, and may be air permeable.

The present invention is also directed to a container assembly including an inner tube disposed within an outer tube with an annular gap therebetween. The annular gap extends between the inner surface of the outer tube and the outer surface of the inner tube, and is in equilibrium with atmospheric pressure at least at the time of assembly. In particular, the annular gap is vented to atmospheric pressure during assembly of the container, such as by imparting an interference engagement between the inner tube and the outer tube adjacent the open top of the outer tube, desirably by providing a spacing element therebetween during assembly.

The side wall of the inner tube is shorter than the side wall of the outer tube, and may be flared outwardly adjacent the open top of the inner tube for sealing and supporting engagement with the side wall of the outer tube.

In a further embodiment, the present invention is directed to a spacer element for venting air between an inner tubular member inserted within an outer tubular member. The element includes a rim portion forming a central opening therethrough and adapted for placement at an open top of the outer tubular member. The spacer element further includes at least one depending portion which is adapted to extend between the inner tubular member and the outer tubular member during insertion of the inner tubular member through the central opening. The depending portion may be adapted for outward flexing upon force, and desirably includes at least two depending portions equally spaced about the rim. The spacer element is desirably in the form of a unitary ring-like structure having a bottom surface for resting on the open top of the outer tubular element, and a plurality of depending portions equally spaced about the rim.

In yet a further embodiment, the present invention is directed to a method of assembling a container including an inner tube contained within an outer tube, and maintaining the inner tube within the outer tube. The outer tube includes a side wall having an inner surface with a recess, such as a circumferential groove, adjacent an open top thereof. The side wall of the inner tube is shorter than the side wall of the outer tube, and includes an outwardly flared portion adjacent the open top of the inner tube. During assembly, the inner tube is inserted within the open top of the outer tube to a position in which the outwardly flared portion of the inner tube extends below a top edge of the recess of the outer tube, thereby causing air trapped between the inner tube and the outer tube to pass through the recess and vent to atmospheric pressure. Preferably, the outwardly flared portion of the inner tube deforms below the top edge of the recess of the inner surface of the outer tube to cause air trapped between the inner tube and the outer tube to pass through the recess. The outwardly flared portion of the inner tube may then contact the top edge of the recess, thereby sealingly supporting the inner tube within the outer tube. Desirably, the inner tube is biased against the top edge of the recess, such as through pressure contact between the bottom surfaces of the tubes. In one particular embodiment, the inner surface of the inner tube may further include a protrusion adjacent the recess, for causing the outwardly flared portion of the inner tube to deform when the outwardly flared portion of the inner tube extends below the top edge of the recess of the inner surface of the outer tube.

In another embodiment of the present invention, a container assembly including an inner tube maintained within an outer tube is provided, in which the inner surface of the side wall of the outer tube includes a recess adjacent the open top thereof. The side wall of the inner tube includes an outwardly flared portion adjacent the open top of the inner tube and extends within the recess of the outer tube. The top of the outward flared portion of the inner tube is biased against a top edge of the recess of the outer tube to sealingly support the inner tube within the outer tube.

BRIEF DESCRIPTION OF THE DRAWINGS

FIG. 2 is an exploded perspective view of one embodiment of the present invention depicting an outer tube, a spacing element, and an inner tube during assembly;

FIG. 3 is a perspective view of the spacing element of FIG. 2 in accordance with the present invention;

DETAILED DESCRIPTION OF THE INVENTION

Figure 1A:
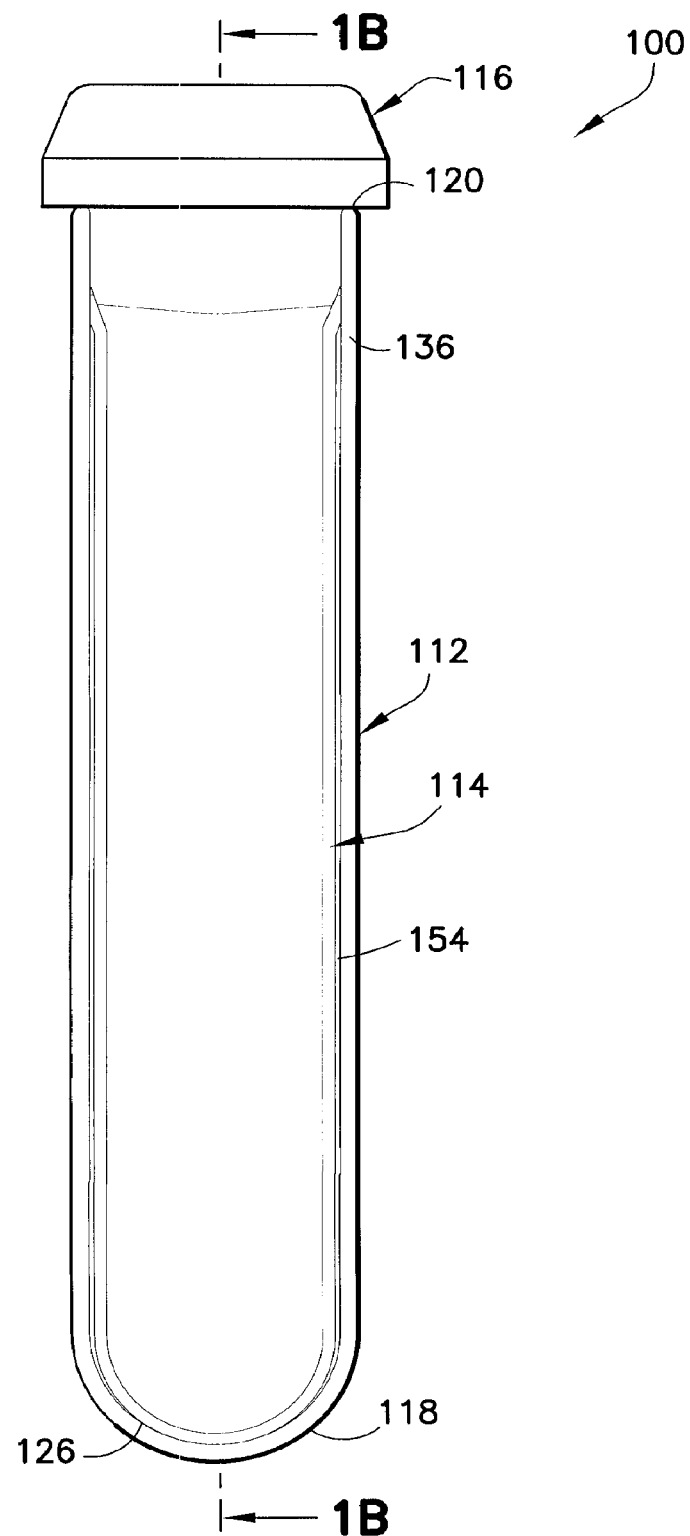
FIG. 1A is a side elevational view of a container assembly of the prior art.

While this invention is satisfied by embodiments in many different forms, there is shown in the drawings and will herein be described in detail, the preferred embodiments of the invention, with the understanding that the present disclosure is to be considered as exemplary of the principles of the invention and is not intended to limit the invention to the embodiments illustrated. Various other modifications will be apparent to and readily made by those skilled in the art without departing from the invention. The scope of the invention will be measured by the appended claims and their equivalents.

Figure 1B:
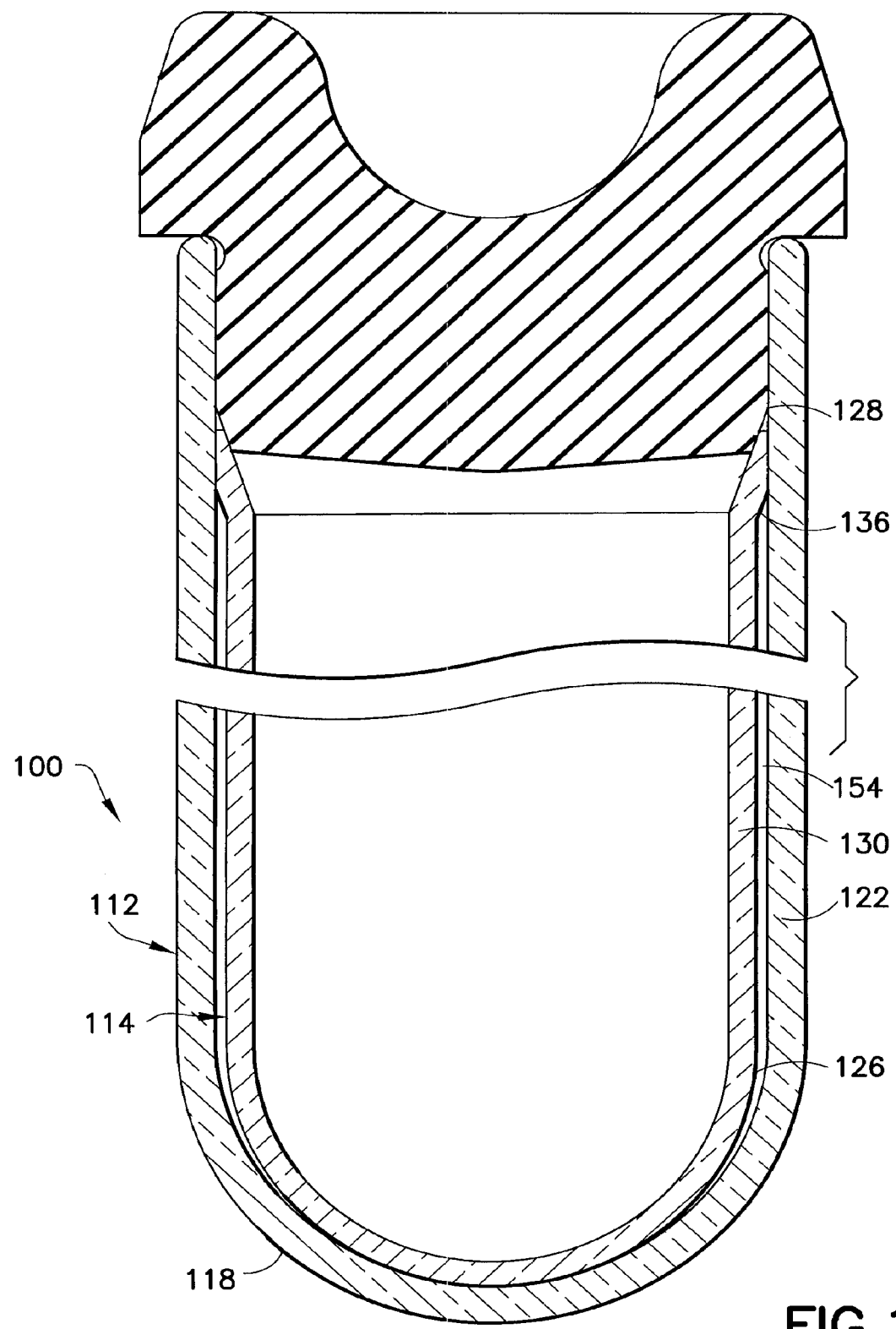
FIG. 1B is a cross-sectional view taken along line B-B of the prior art container assembly of FIG. 1A.
Figure 1C:
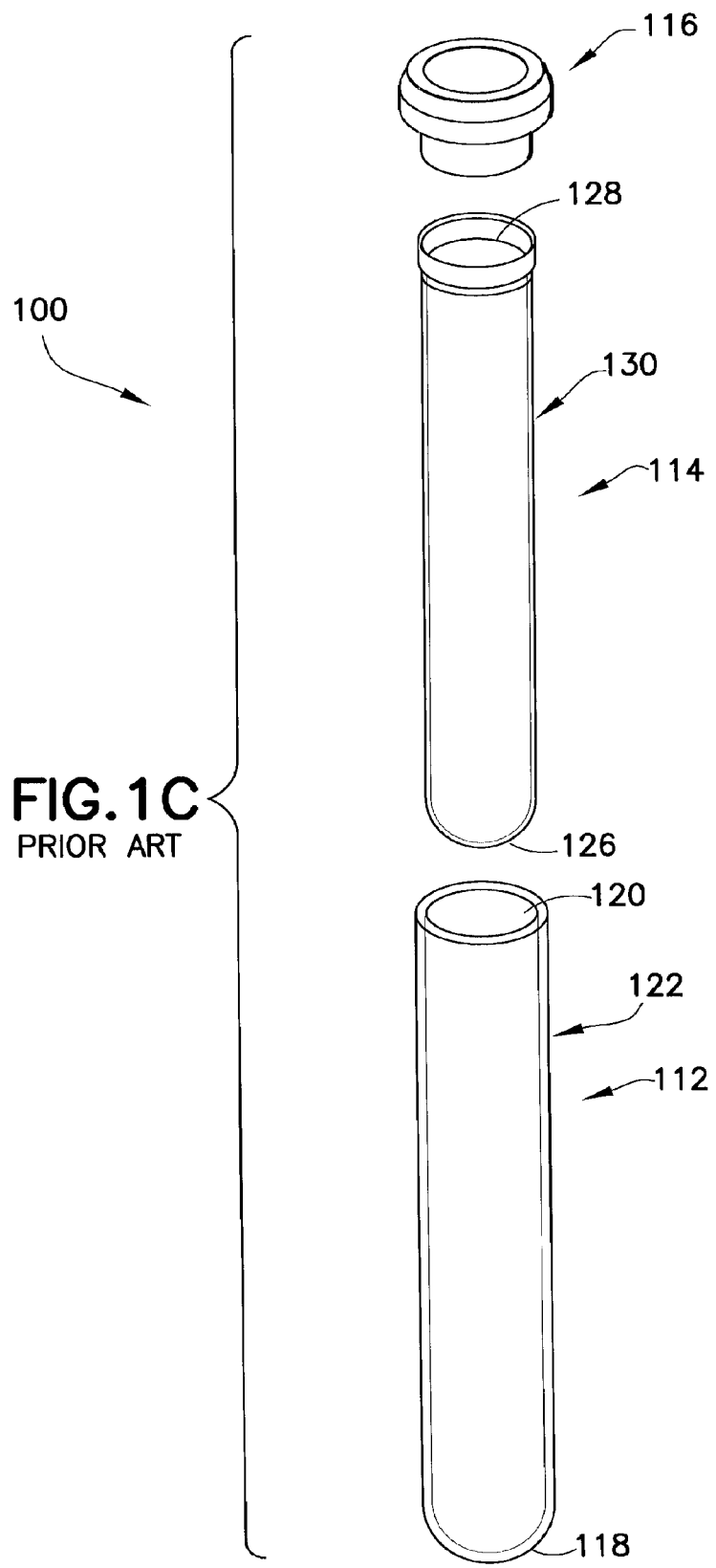
FIG. 1C is an exploded perspective view of the prior art container assembly of FIG. 1A.

FIGS. 1A, 1B, and 1C are directed to a container assembly 100 of the prior art. The assembly 100 includes an outer tube 112, an inner tube 114 and a closure 116. Outer tube 112 is unitarily formed and includes a generally spherical closed bottom wall 118, an open top 120 and a cylindrical side wall 122 extending therebetween, whereby side wall 122 slightly tapers from open top 120 to closed bottom wall 118. Inner tube 114 is unitarily formed and includes a generally spherical closed bottom wall 126, an open top 128, and a cylindrical side wall 130 extending therebetween, whereby side wall 130 slightly tapers from open top 128 to closed wall 126. Side wall 130 includes an outwardly flared outer surface 136 adjacent open top 128 of inner tube 114. A substantially cylindrical space 154 is defined between inner tube 114 and outer tube 112. Assembly 100 is assembled by slidably inserting inner tube 114 into open top 120 of outer tube 112. During such assembly, pressure may build up in the space 154 between the inner tube 114 and the outer tube 112. Such pressure can make assembly difficult, and can result in the inner tube 114 not being fully inserted within the outer tube 112, or being gradually forced out of the outer tube 112 over time.

The present invention is directed to a method of assembling a container having an inner tube contained within an outer tube which overcomes these problems. FIG. 2 illustrates a configuration utilized to assemble a container assembly 10 according to a method of the present invention. The configuration includes an outer tube 12, an inner tube 14, and a spacing element 16.

Outer tube 12 is unitarily formed from a first plastic material and is similar in construction to the prior art outer tube 12 described above, including a generally spherical closed bottom wall 18, an open top 20 and a cylindrical wall 22 extending therebetween. Side wall 22 may slightly taper from open top 20 to closed bottom wall 18. Outer tube 12 defines a length "a" from the interior of the bottom wall 18 to the open top 20. Side wall 22 of outer tube 12 includes a generally cylindrical inner surface 24 with an inside diameter "b" and an outer surface 25.

Inner tube 14 is unitarily formed from a second plastic material and is similar in construction to the prior art inner tube 14 described above, including a generally spherical closed bottom wall 26, an open top 28 and a cylindrical side wall 30 extending therebetween. Side wall 30 may slightly taper from open top 28 to closed bottom wall 26. Inner tube 14 defines an external length "c" that is desirably less than internal length "a" of outer tube 12. Side wall 30 of inner tube 14 includes a generally cylindrical section 32 extending from bottom wall 26 toward open top 28 of inner tube 14, and includes an inner surface 39 and an outer surface 41.

Figure 4A:
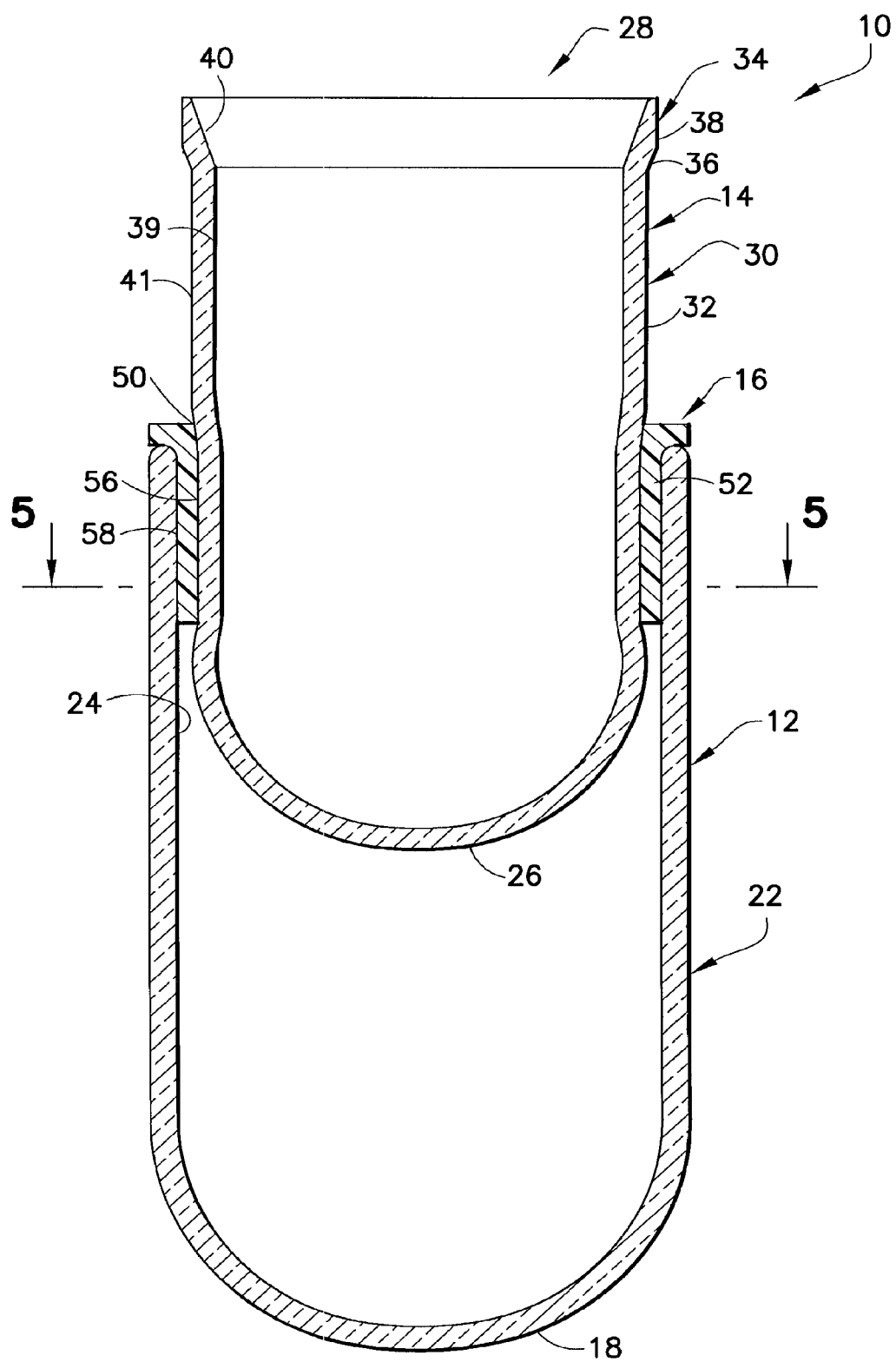
FIG. 4A is a cross-sectional view of the inner tube partially inserted in the outer tube during assembly.

As illustrated in FIG. 4A, side wall 30 is further characterized by a circumferentially enlarged section 34 adjacent open top 28 forming an outwardly flared outer surface 36 adjacent cylindrical portion 32 of side wall 30 and a cylindrical outer surface 38 adjacent open top 28 of inner tube 14. Additionally, enlarged top section 34 of side wall 30 includes a conically flared inner surface 40 adjacent open top 28.

Cylindrical portion 32 of side wall 30 of inner tube 14, defining the inner surface 39 of the inner tube 14, desirably has a diameter "d" that is less than inside diameter "b" of side wall 22 on outer tube 12. In this manner, an annular gap 60 is established between the outer tube 12 and the inner tube 14.

As noted, the outer tube 12 and the inner tube 14 are formed from plastic materials, and are desirably distinct plastic materials exhibiting different properties. Neither plastic material is required to meet all of the sealing requirements for the container. However, the respective plastic materials cooperate to ensure that the assembly achieves the necessary sealing, adequate shelf life and acceptable clinical performance. Preferably, one of the tubes may be formed from a material that exhibits acceptable gas vapor barrier characteristics, and the other of the containers may be formed from a material that provides a moisture bather. The inner tube should also be formed from a material that has a proper clinical surface for the material being stored in the container assembly. Examples of particularly useful materials include polymeric materials such as polyethylene terephthalate, polypropylene, polystyrene, polycarbonate, and the like. In one preferred embodiment, outer tube 12 is formed from a polyethylene terephthalate, and inner tube 12 is formed from polypropylene. Such an embodiment provides excellent gas and vapor barrier properties, and provides the inner tube 12 as a softer material than the outer tube 12, as will be discussed in more detail herein.

FIG. 3 illustrates the spacer or spacing element 16 of the present invention. The spacing element 16 functions to allow air to vent out of the container assembly 10 during assembly, such as by deforming one or both of the inner tube 14 or the outer tube 12 to form a gap. Additionally, the spacing element 16 functions to improve alignment of the inner tube 14 within the outer tube 12 during assembly. The spacing element 16 includes a central opening 50 and at least one extending member 52. The spacing element is preferably a unitary structure including a circumferential rim 54 defining the central opening 50 therethrough. The central opening 50 has a diameter "f" which is substantially equivalent to the outer diameter of the inner tube 14. The rim 54 of the spacing element 16 preferably rests on the open top 20 of the outer tube 12, thereby aligning the central opening 50 with the open top 20 of the outer tube 12. During assembly, inner tube 14 is inserted into the outer tube 12 through the central opening 50.

The spacing element 16 further includes at least one extending member 52 having an inner surface 56 and an outer surface 58. Desirably, the spacing element 16 includes a plurality of extending members 52 equally spaced along the rim 54 on opposing sides of the spacing element 16. The extending members 52 may be of any size and geometric shape, such as cylindrically-shaped, rod-shaped, or the like, so long as they are capable of establishing a mechanism for air trapped between outer tube 12 and inner tube 14 to vent to atmospheric pressure during insertion of inner tube 14 within outer tube 12, as will be discussed in more detail. It is contemplated that spacing element 16 may be provided in a variety of forms, so long as it provides structure for interference engagement during insertion of the inner tube 14 within the outer tube 12 to vent any air trapped therebetween to atmospheric pressure. For example, spacing element 16 may be provided as a flexible rigid string-like material, or may be provided as a plurality of rod-like structures tied together through a string to form the structure.

The spacing element 16 may be made of any rigid flexible material, and is desirably a unitary structure constructed of plastic material. Preferably, the material forming the spacing element 16, or at least the extending members 52 of the spacing element 16, be at least as hard as the material forming either the outer tube 12 or the inner tuber 14, or both. Alternatively, the extending members 52 of the spacing element 16 may be hollow or formed of an air preamble material to provide for venting.

As indicated, the spacing element 16 provides a mechanism for venting any air trapped between the outer tube 12 and the inner tube 14 to atmospheric pressure during insertion of the inner tube 14 within the outer tube 12 by providing an interference engagement therebetween. During assembly, the spacing element 16, and in particular the extending members 52, are positioned or located between the inner surface 24 of the outer tube 12 and the outer surface 41 of the inner tube 14. Upon insertion of the inner tube 14 into the outer tube 12, the extending members 52 create an interference engagement between the inner tube 14 and the outer tube 12 at the point of contact therebetween, which provides for deformation of either the inner tube 14 or the outer tube 12, thereby creating a uniform venting gap 61 to allow venting of air during assembly.

Figure 4B:
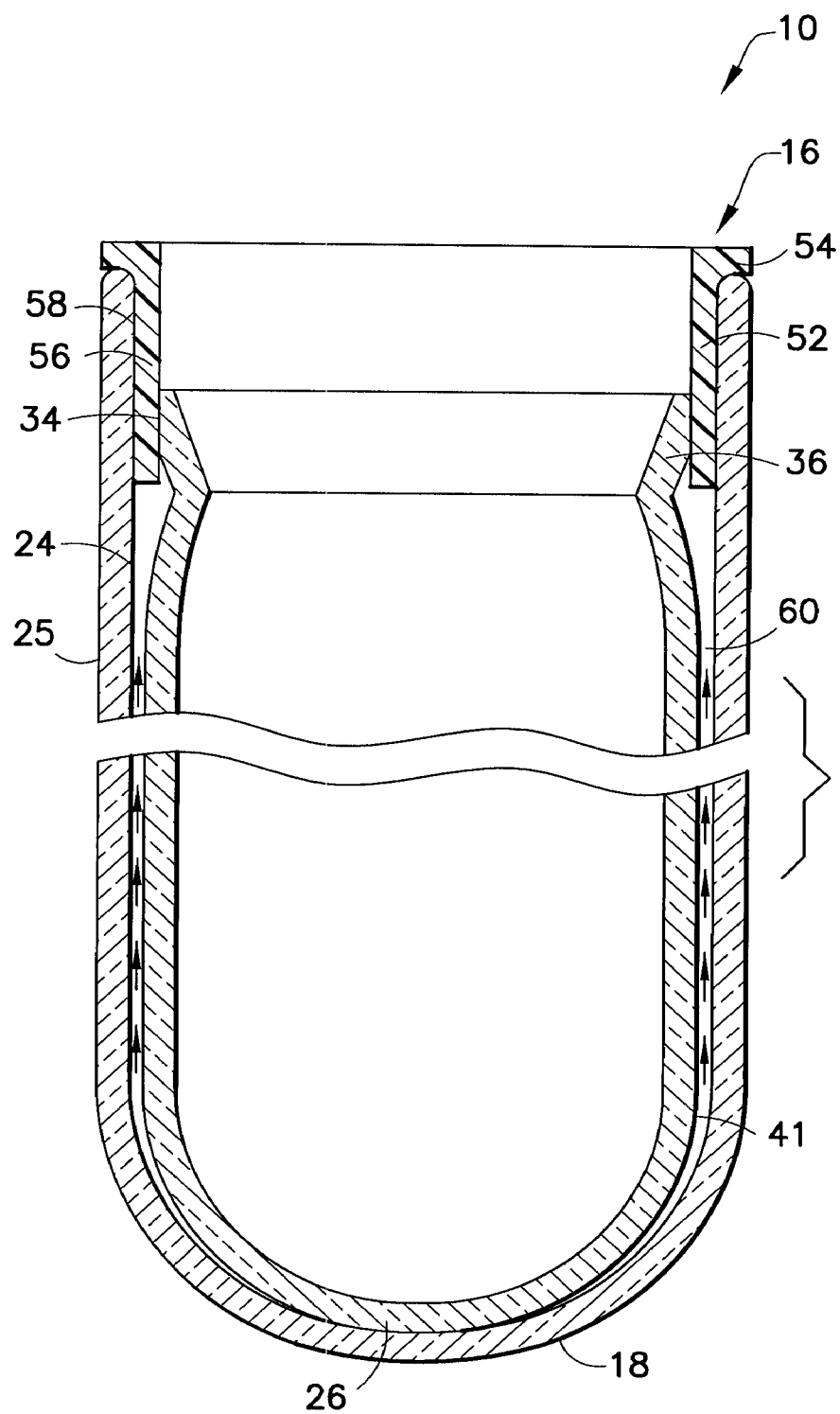
FIG. 4B is a cross-sectional view of the inner tube fully inserted in the outer tube during assembly.
Figure 4C:
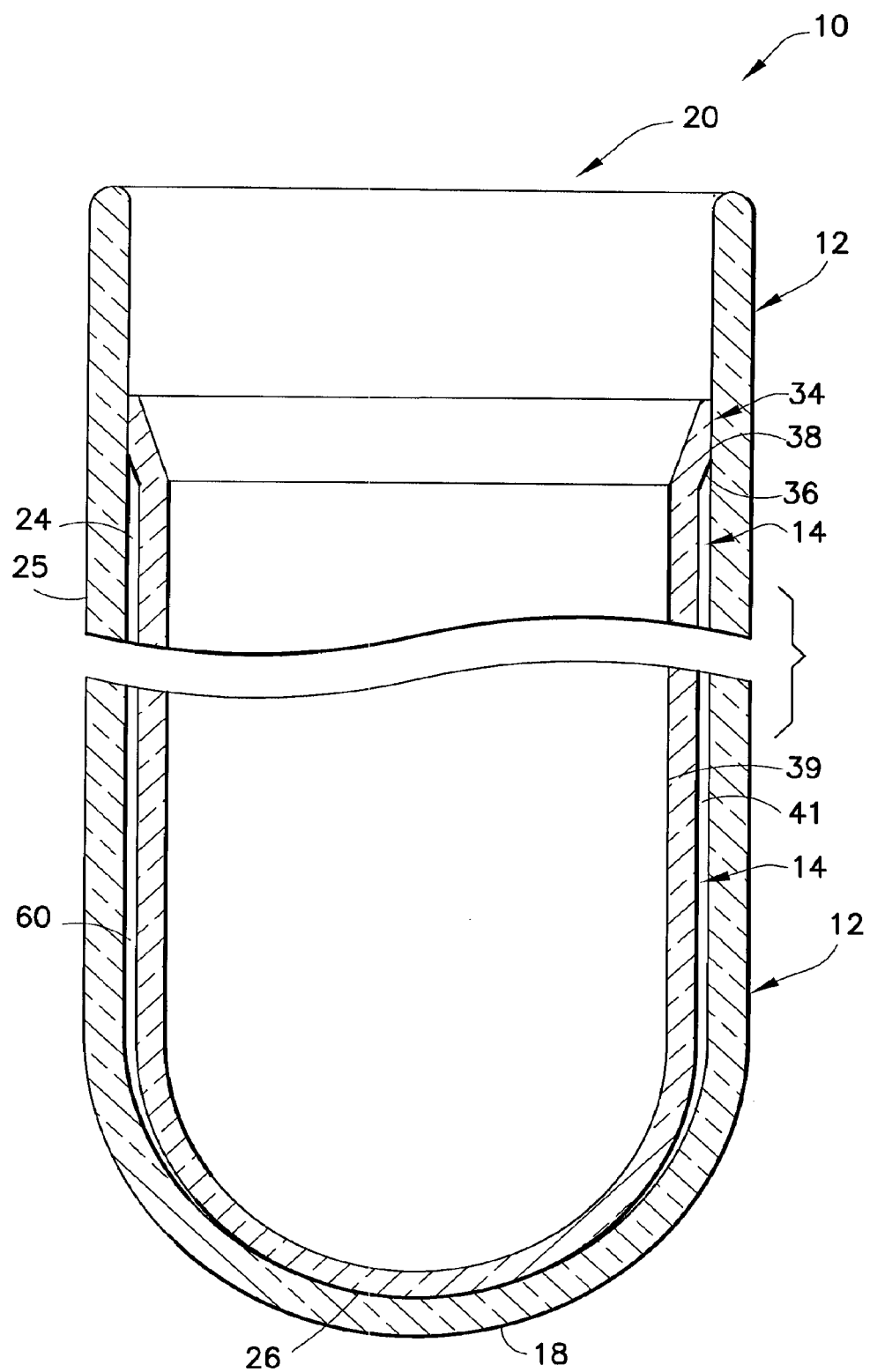
FIG. 4C is a cross-sectional view of a container fully assembled in accordance with the method of the present invention.

FIGS. 4A-4C will be described in connection with assembly of the container in accordance with the present invention. FIG. 4A illustrates a cross-section of the container 10 during assembly. Assembly of the container 10 typically occurs by a press-fit technique, whereby the inner tube 14 is press-fit into the outer tube 12 along an assembly line, such as through the use of a press mechanism, air pressure, or other means for press-fitting an inner tube within an outer tube. Prior to inserting inner tube 14 within outer tube 12, the spacing element 16 is in contact with the open end 20 of the outer tube 12, such that the outer surface 58 of the extending members 52 is in contact with the inner surface 24 of the outer tube 12. As shown in FIG. 4A, during assembly, the inner tube 14 is inserted into the outer tube 12 through the central opening 50 of the spacing element 16. As the inner tube 14 is inserted through the central opening 50 of the spacing element 16, the outer surface of the inner tube 14 makes contact with the inner surface 56 of the extending members 52. This contact may cause extending members 52 to flex outwardly against the inner surface 24 of outer tube 12.

Figure 5:
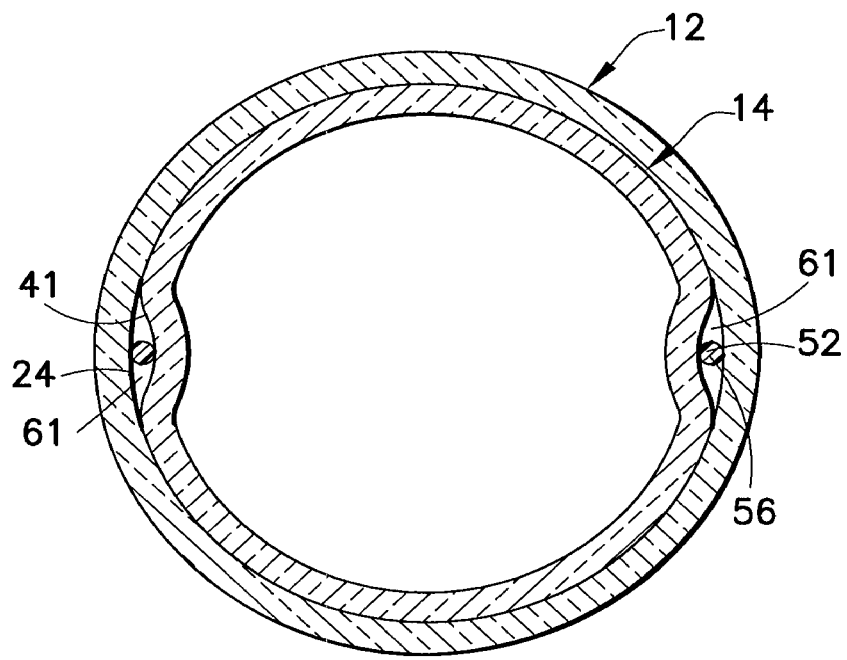
FIG. 5 is a cross-sectional view taken along line 5-5 of FIG. 4A, showing assembly in accordance with one embodiment of the present invention.

Even in embodiments in which there is an annular gap 60 formed between the two tubes, the outer diameter of the inner tube 14 is substantially similar to the inner diameter of the outer tube 12. Accordingly, as the inner tube 14 is inserted into the outer tube 12, the spacing element 16 creates an interference engagement between the two tubes. The geometry and material structure of the spacing element and the two tubes causes deformation to occur based on this interference engagement. For example, in embodiments where the inner tube is softer than the outer tube and the spacing element 16 is constructed of a material which is at least as hard as the outer tube, the interference engagement will cause the side wall 22 of the inner tube 14 to deform in shape, as shown in FIG. 5. This creates a vent gap 61, which will permit venting of air from between the two tubes out through the top of the assembly adjacent the contact point of the two tubes to atmospheric pressure, thereby eliminating any build up of pressure.

As the inner tube 14 continues to be inserted within the outer tube 12 as illustrated in FIG. 4B, at least a portion of the outer surface 41 of the inner tube 14 may come into contact with at least a portion of the inner surface 24 of the outer tube 12, such as the contact between the respective bottom surfaces 18 and 26. Additionally, at least a portion of the enlarged section 34 of the inner tube 14 adjacent the open top 28 of the inner tube 14 frictionally engages with the inner surface 56 of the extending members 52 of the spacing element 16. Upon contact of the extending members 52 of the spacing element 16 with the enlarged section 34 of the inner tube 14, the enlarged section 34 of the inner tube 14 deforms further allowing venting of trapped air within the outer tube 12 to travel through the annular gap 60 towards the open top of the inner tube 14. Upon completion of the container assembly 10, the spacing element 16 is removed, thereby allowing cylindrical outer surface 38 of the inner tube 14 to sealingly and supportingly engage with the inner surface 24 of the outer tube 12, as shown in FIG. 4C.

A container closure can further be provided on the open end of the container, such as an elastomeric stopper as in known in the art. Moreover, the container can be evacuated using any evacuation techniques. The container assembled as such is particularly useful as an evacuated blood collection container for blood collection procedures, as are commonly known in the art.

Figure 6:
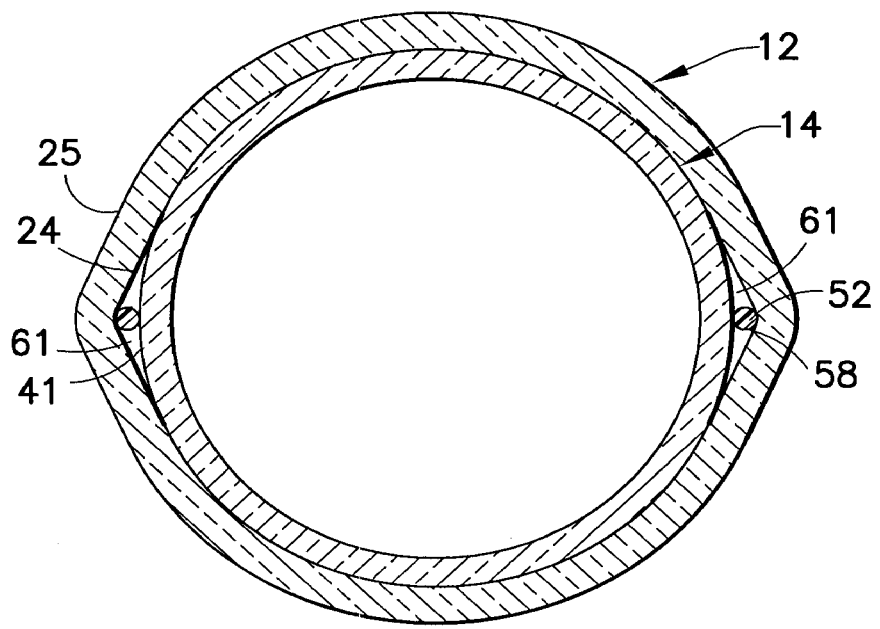
FIG. 6 is a cross-sectional view of a container during assembly in accordance with another embodiment of the present invention.

FIG. 6 illustrates a cross-sectional view of the container during assembly in a variation. In particular, FIG. 6 illustrates an alternative arrangement where the extending member 52 of the spacing element 16 is at least as hard as the inner tube 14, with the outer tube 12 made of a softer material. This arrangement causes the outer tube 12 to deform at the areas in contact with the outer surface 58 of the extending members 52, thereby creating an elliptical-like shape to form the venting gap 61.

While the above-described specific embodiments of the present invention, other variations are contemplated. For example, the extending members 52 of the spacing element 16 may extend along the entire length of the container assembly during assembly to achieve greater venting. Additionally, while the method of assembling the container assembly 10 was described with the spacing element 16 associated with the open top 20 of the outer tube 12, the container assembly 10 alternatively may be assembled by having the spacing element 16 associated in frictional engagement with the outer surface 41 of the inner tube 14 prior to assembly. Therefore, the spacing element 16 comes into contact and rests on the open top 20 of outer tube 12 when inserting the inner tube 14 into the outer tube 12. It is also contemplated that, in automated assembly procedures involving a press mechanism for insertion of the inner tube 14 within the outer tube 12, the spacing element 16 can be automatically removed by frictional engagement with the press mechanism as it exits the inner tube 14.

Figure 7:
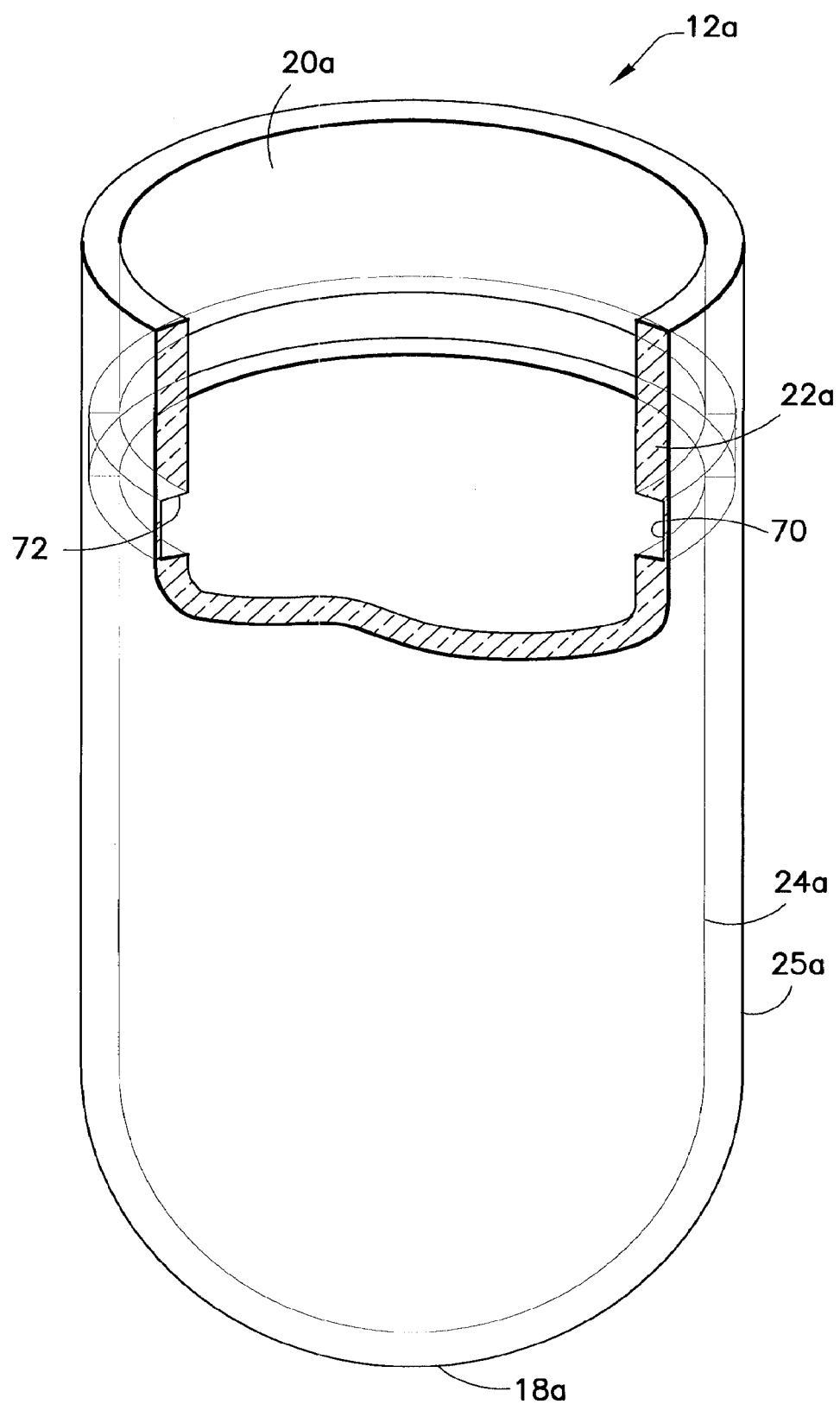
FIG. 7 is a perspective cross-sectional view of an outer tube having a recessed groove in accordance with a further embodiment of the present invention.
Figure 8A:
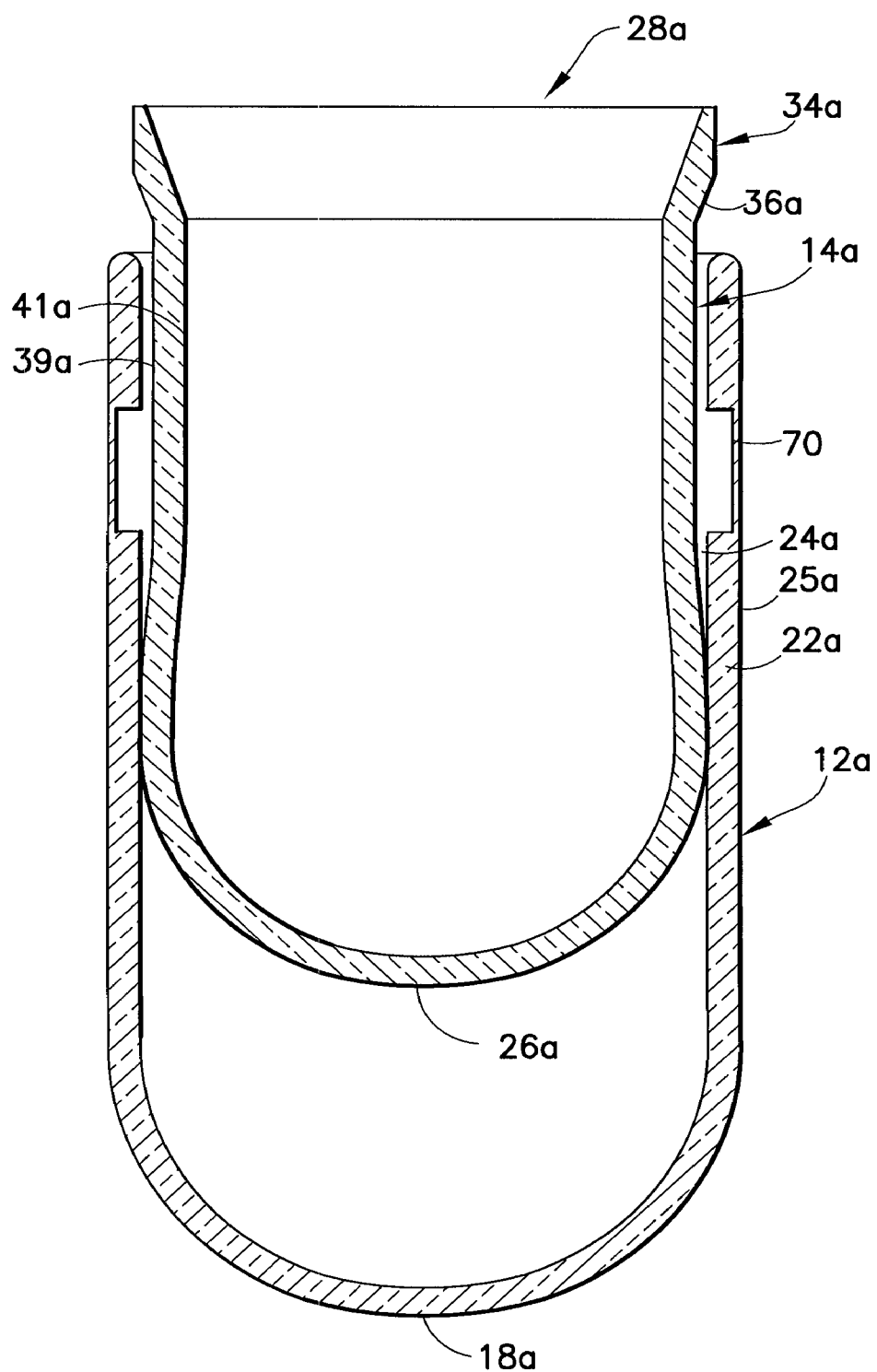
FIG. 8A is a cross-sectional view of an inner tube partially inserted in the outer tube of FIG. 7 during assembly.
Figure 8B:
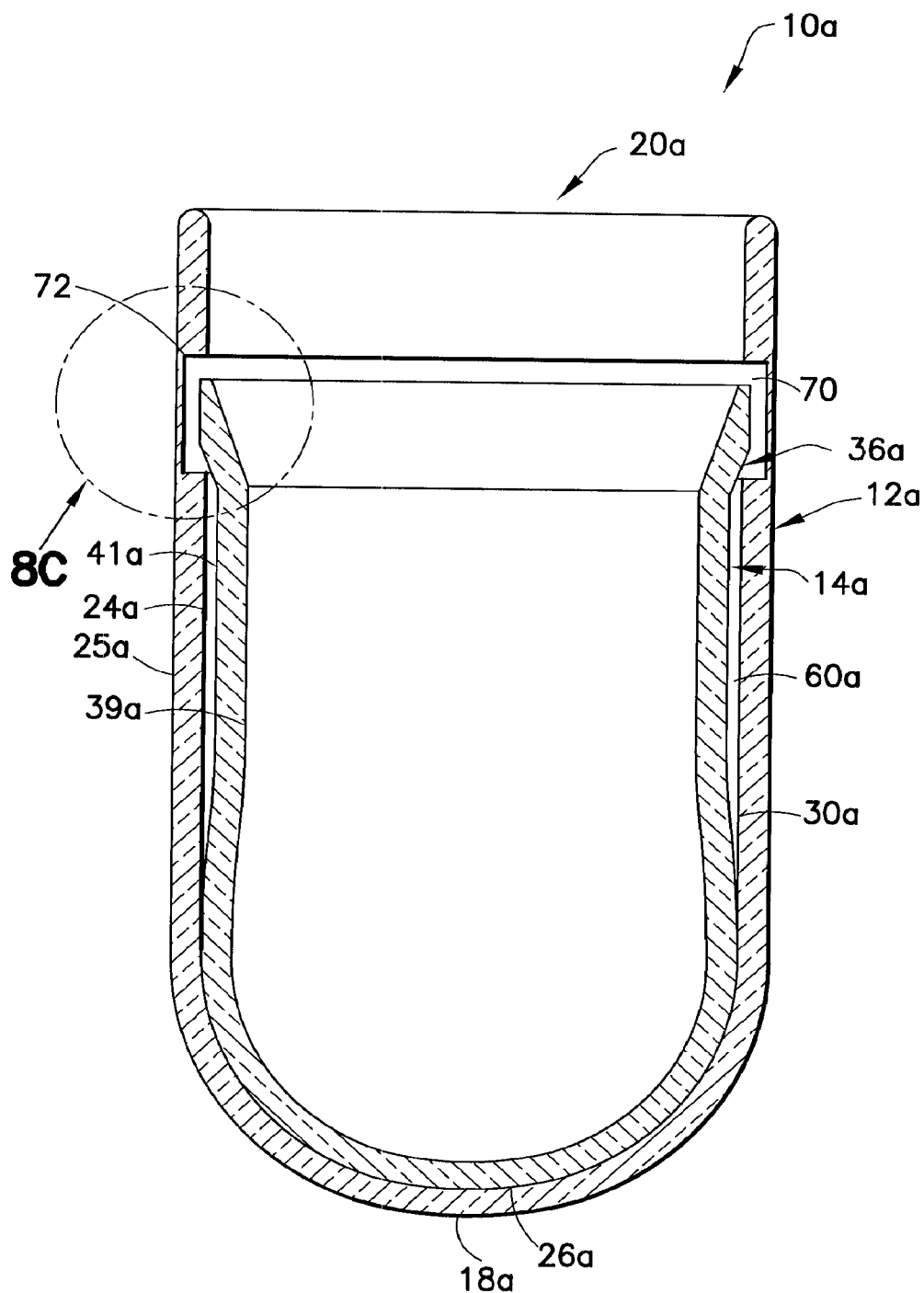
FIG. 8B is a cross-sectional view of a container assembly having the side wall of an inner tube below the recess in the outer tube of FIG. 7 during assembly.
Figure 8C:
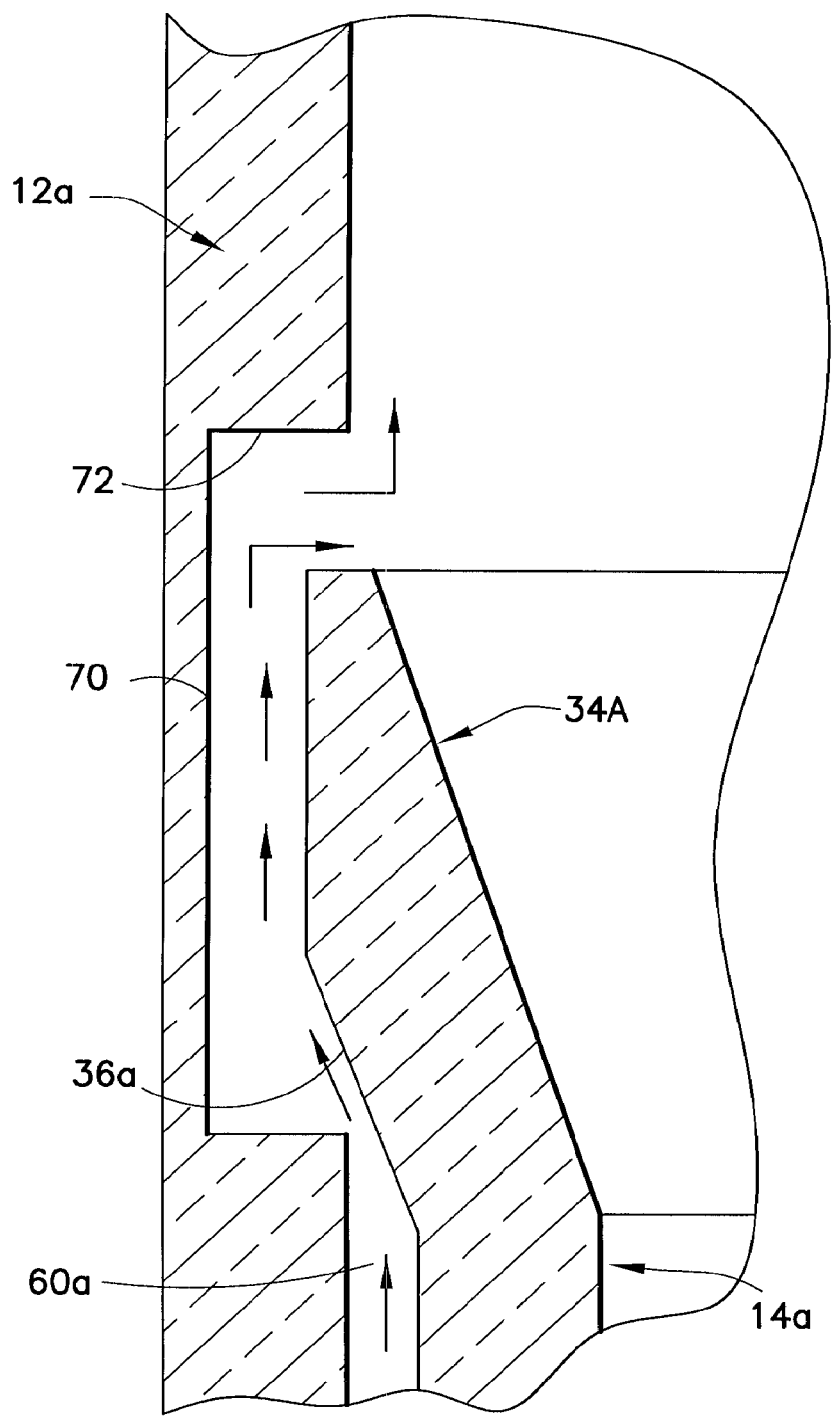
FIG. 8C is a cross-sectional view indicating the air path when the side wall of the inner tube is below the recess of the outer tube of FIG. 7.
Figure 8D:
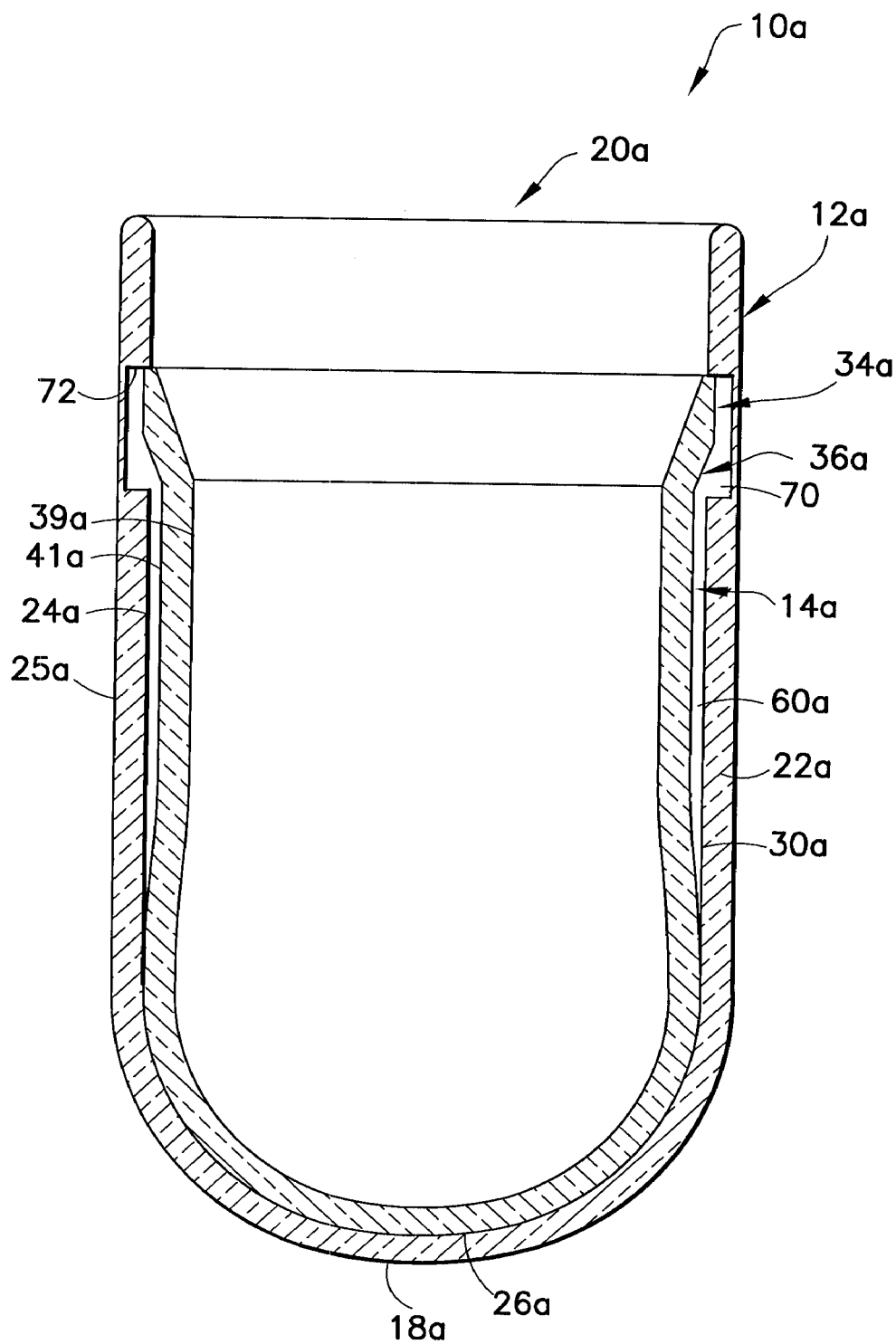
FIG. 8D is a cross-sectional view of the inner tube after assembly with the side wall of the inner tube in contact with a top edge of the recess.

FIGS. 7-8D depict a further embodiment of the invention, which includes many components which are substantially identical to the components of FIGS. 2-6. Accordingly, similar components performing similar functions will be numbered identically to those components of FIGS. 2-6, except that a suffix "a" will be used to identify those similar components in the embodiments of FIGS. 7-8D, a suffix "b" will be used to identify those similar components in FIGS. 9A and 9B, and a suffix "c" will be used to identify those similar components in FIG. 10.

In the embodiment of FIGS. 7-8D, the outer tube 12a includes a bottom wall 18a, an open top 20a, and a side wall 22a extending therebetween. The side wall 22a defines an inner surface 24a and an outer surface 25a. The inner surface 24a further includes a recessed area, such as groove or recess 70 adjacent the open top 20a of the outer tube 12a. While FIG. 7 illustrates the outer tube 12a having the recess 70 extending circumferentially around the inner surface 24a of the outer tube 12a, it is contemplated that the recess 70 of the outer tube 12a may take other forms. For example, it may extend longitudinally to the open end 20a of the outer tube 12a. Additionally, the outer tube 12a may further include a longitudinal groove (not shown) extending between the recess 70 on the inner surface 24a of the outer tube 12a to the open end 20a of the outer tube 12a. Alternatively, the recess may encompass the interior surface of the outer tube and/or the exterior surface of the inner tube having an irregular surface texture, such as a roughened surface. In such an embodiment, such surface texture may provide a path for fluid flow out to the external environment, and/or may provide a mechanism for retaining the inner tube within the outer tube in a frictional engagement. Other variations as understood by one skilled in the art may also be utilized.

The inner tube 14a includes the closed bottom 26a, an open top 28a, and a side wall 30a having an inner surface 24a and an outer surface 25a extending therebetween. The side wall 30a of the inner tube 14a is shorter than the side wall 22a of the outer tube 12a. The side wall 30a of the inner tube 14a also includes the outwardly flared portion 36a adjacent the open top 28a of the inner tube 12a.

FIGS. 8A, 8B, 8C and 8D further illustrate a method according to this embodiment of the present invention. During assembly, as illustrated in FIG. 8A, the inner tube 14a is provided within the outer tube 12a. The relative diameters of the outer tube 12a and the inner tube 14a establish a hoop stress on the outwardly flared portion 36a, thereby causing the outwardly flared portion 36a to become radially compressed. As shown in FIGS. 8B, the inner tube 14a is inserted within the open top 20a of the outer tube 12a to a position in which the outwardly flared portion 36a of the inner tube 14a is forced to extend below a top edge 72 of the recess 70 of the inner surface 24a of the outer tube 12a. At this point, the nature of the construction of inner tube 14a with outwardly flared portion 36a will cause the outwardly flared portion 36a to relax or return to a normal uncompressed state, such that any hoop stress will be relieved and outwardly flared portion 36a will radially expand within recess 70. As the inner tube 14a is inserted to a position in which the respective bottoms of the tube contact, further insertion force against the inner tube will cause the inner tube 14a to be biased, and will cause the side wall 22a of the inner tube to bend and/or deform with continued pressure exerted on the inserted inner tube 14a.

To complete assembly of container assembly 10a, the insertion pressure exerted against inner tube 14a is released. The bias exerted between the bottom surfaces of the two tubes causes the inner tube 14a to be forced toward the open end of the outer tube 12a. The outwardly flared surface 36a is then trapped within recess 70, and a portion of the outwardly flared surface 36a, such as the top edge of the inner tube 14a, is forced in abutting relation against the top edge 72 of recess 70. This abutting interference relationship prevents inner tube 14a from being removed or forced out of containment within outer tube 12a. Alternatively, the outer wall portion of outwardly flared surface 36a may be forced radially outwardly against the sidewall surface within recess 70 from the bias, thereby exerting an abutting interference force to maintain inner tube 14a in place.

It is contemplated that the biasing force between the two tubes can be established, for example, through the build-up of air pressure between the two tubes, without the need for contact between the bottom surfaces. As such, the insertion force must be sufficient to overcome this build up of pressure to force the inner tube to a location at which the outwardly flared portion 36a extends within the recess 70, and can thereafter be released, permitting the built-up pressure between the two tubes to bias the inner tube 14a upwardly toward the open end of outer tube 12a, forcing abutting engagement against top edge 72 of recess 70.

Alternatively, any pressure build-up between the two tubes can be vented or released during assembly. For example, as illustrated by the arrows in FIG. 8C, the bias between the two tubes can deform the inner tube 14a. The bending and/or deformation moves the top end of the inner tube 14a adjacent outwardly flared surface 36a out of contact with the inner surface of the outer tube 12a, establishing a path for air trapped between the two tubes to flow up towards the open top 20a of the outer tube 12a and escape through the recess 70 and vent to atmospheric pressure. As such, any air build up or trapped between the two tubes can vent through the air channel established by eliminating the contact between the inner tube and the inner surface of the outer tube, and continue venting up through the recess and out to ambient air. The bias of the contact between the two tubes can then force the inner tube 14a toward the open end of the outer tube 12a, with the outwardly flared surface 36a of the inner tube 14a contacting the top edge 72 of the recess 70, thereby sealingly supporting the inner tube 14a within the outer tube 12a. At this point, any pressure gradient present between the inner tube 14a and the outer tube 12a is equilibriated to atmospheric conditions.

Alternatively, the biasing mechanism could be a structural element of one of the inner tube 14a or outer tube 12a, or may be a distinct separate element. For example, the bottom of the outer tube 12a could have a convex feature that is able to move slightly downward in response to pressure from the inner tube 14a, but remain biased in the upward direction. An arch-shaped member that would act similarly could be placed into the bottom of the outer tube 12a prior to insertion of the inner tube 14a. Or, a substantially immovable feature could be placed or molded into the bottom of the outer tube 12a, with the bottom of the inner tube 14a made to deform slightly upon contact with the immovable feature, but to bias upwards upon removal of the insertion force. Further, as indicated above, it is contemplated that no biasing force will be required if sufficient trapped air remains to force the inner tube 14a up against the groove with sufficient force.

It is also possible to include only a vertical groove at only a top portion of the outer tube 12a. Upon insertion of an inner tube 14a with a flared out top region, the vertical groove will provide a path for air to escape from the annular gap region. The length of the groove is designed such that at least a portion of the flared region 36a of the inner tube 14a will move past the bottom of the groove upon assembly, to thereby provide a 360° circumferential seal.

Figure 9A:
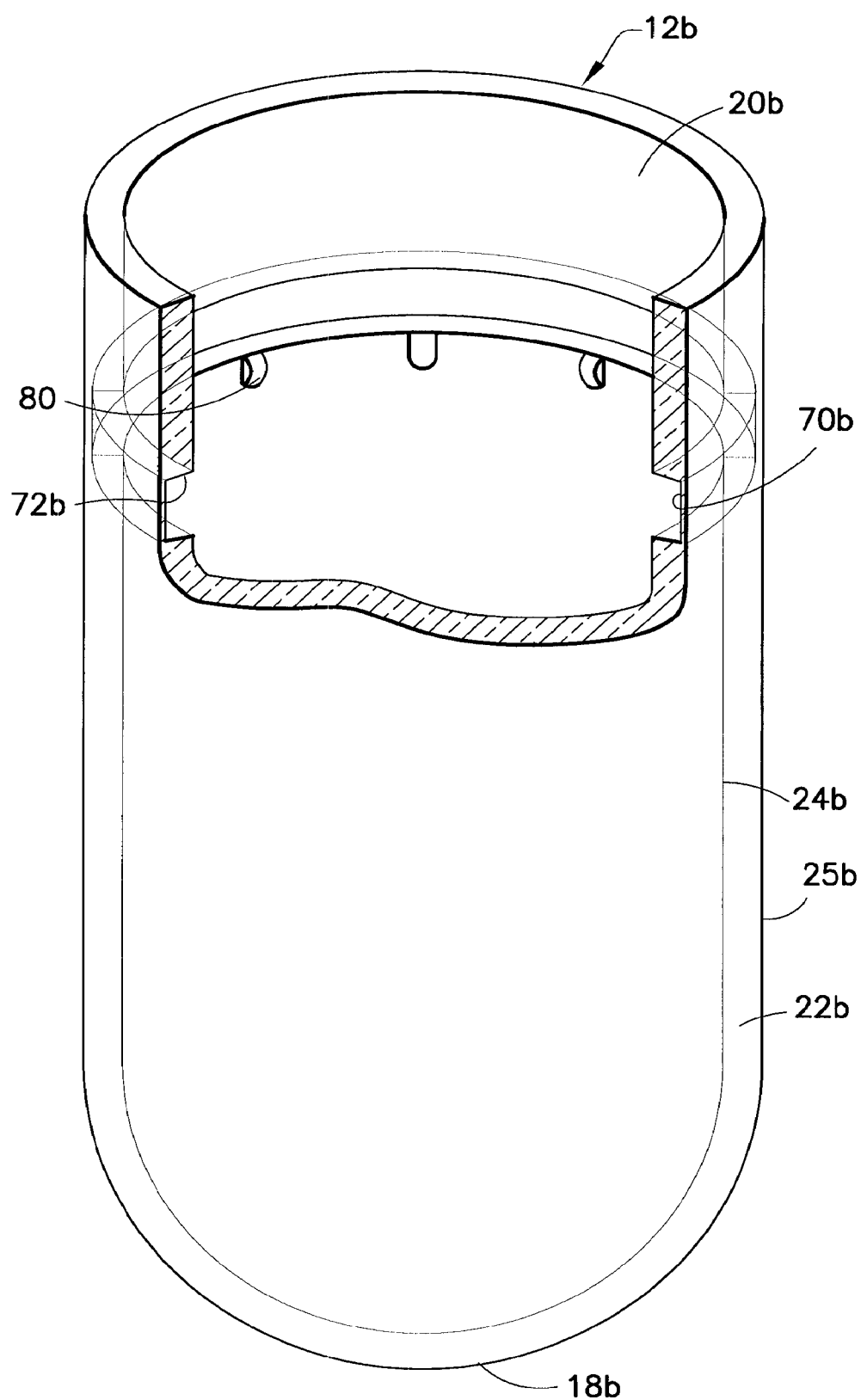
FIG. 9A is a perspective cross-sectional view of an outer tube having protrusions and a recess in accordance with a further embodiment of the present invention.
Figure 9B:
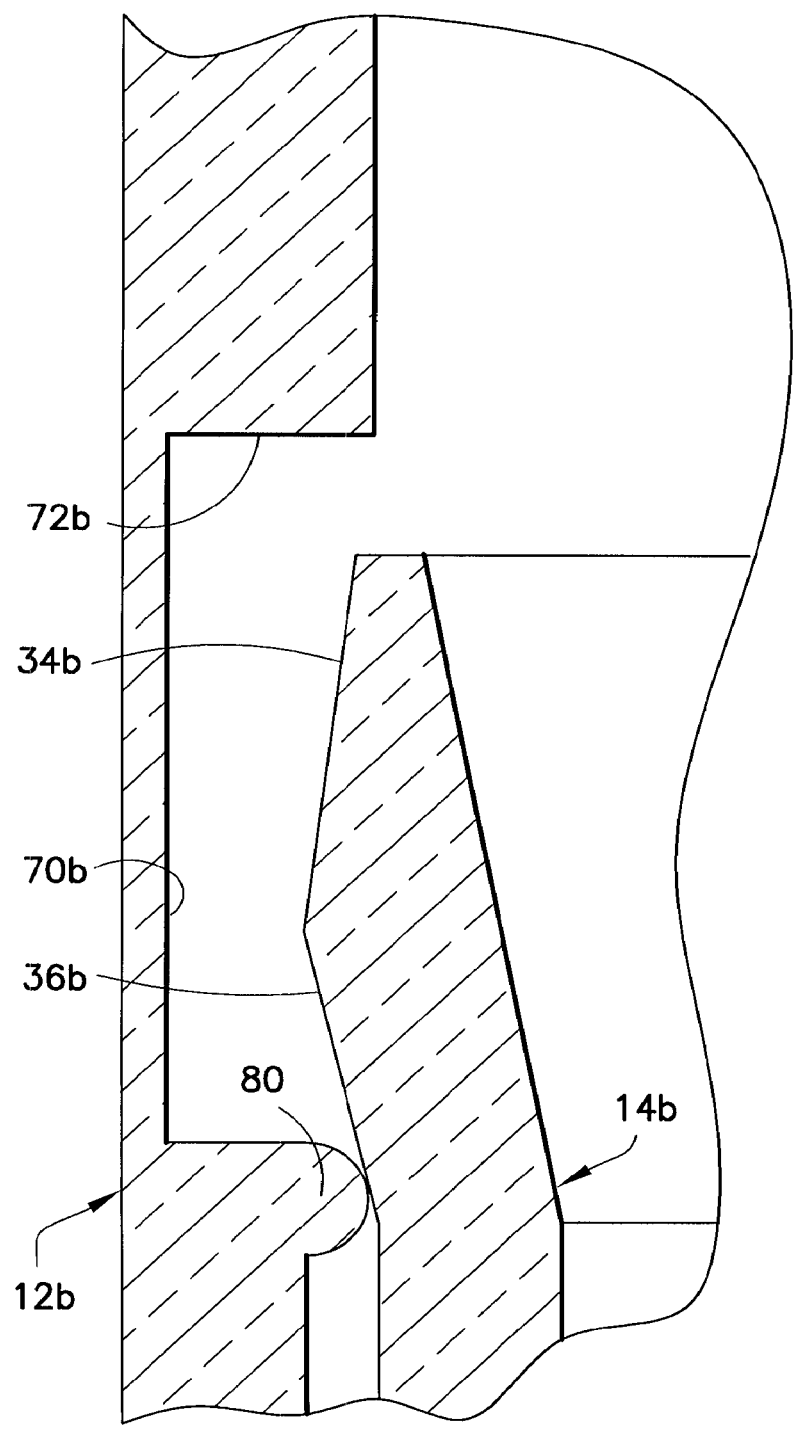
FIG. 9B is a cross-sectional view of the outer tube of FIG. 9A.

A variation on the embodiment of FIGS. 7-8D is illustrated in FIGS. 9A and 9B. FIG. 9A illustrates an outer tube 12b having at least one protrusion 80 adjacent the recess 70b. Preferably the outer tube 12b includes a plurality of protrusions 80 equally spaced about the circumference of the inner surface outer tube 12b adjacent the recess 70b. The protrusions 80 extends radially inwardly, thereby contacting the side wall 30b of the inner tube 14b as illustrated in FIG. 9B. Upon contact, the protrusions 80 cause at least a portion of the side wall 30b of the inner tube 14b to deform outwardly, creating the annular 60b in between protrusions 80. The protrusions 80 may be any shape or size so long as it is made of a material harder than the inner tube 14b.

Figure 10:
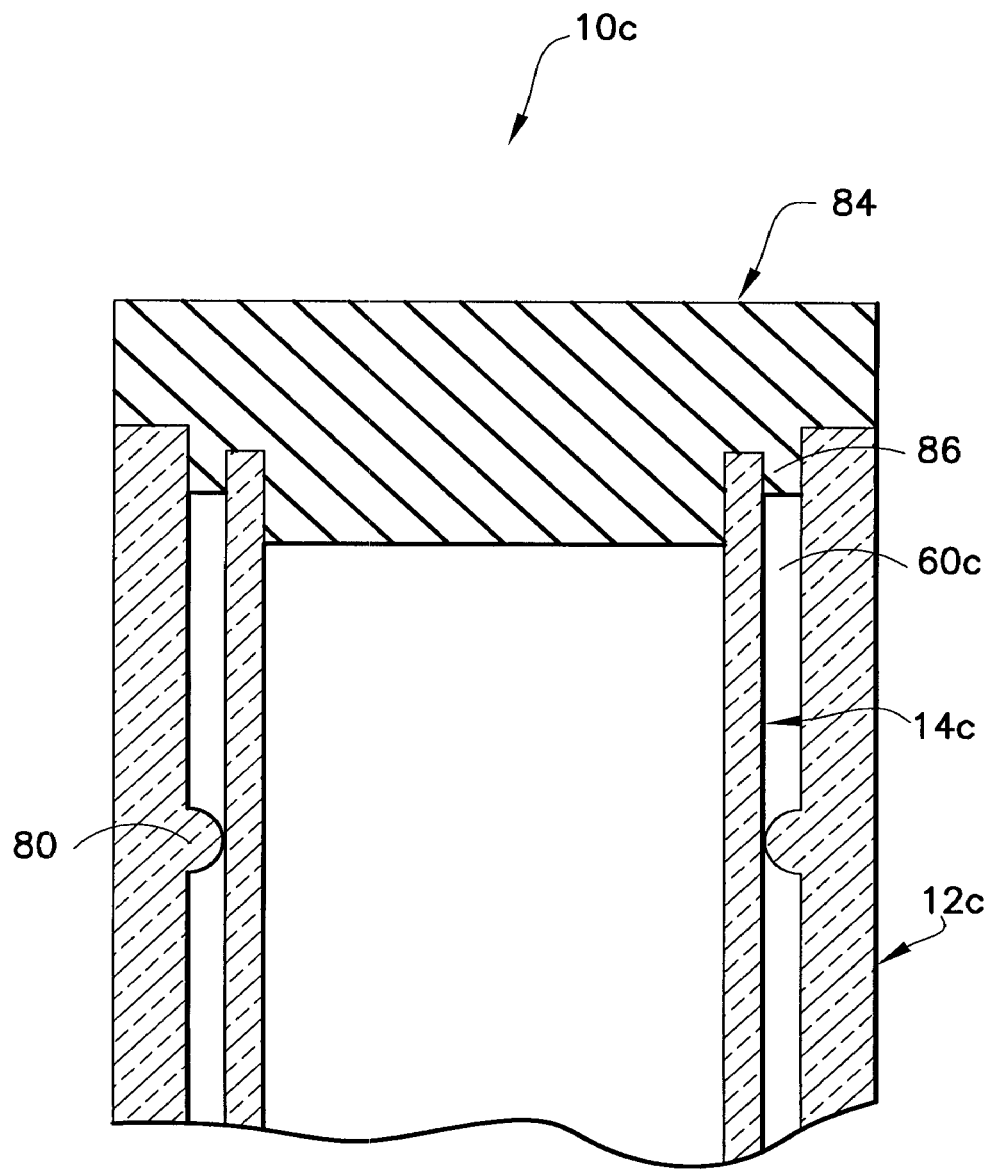
FIG. 10 is a cross-sectional view of a container assembly having a closure in accordance with another embodiment of the present invention.

FIG. 10 illustrates another embodiment of the present invention. In this embodiment, it is possible to size the tubes 12c, 14c such that the annular gap 60c exists between the outer tubes 12c and the inner tubes 14c over the entire length of the container assembly 10c, as opposed to providing the inner tube 14c with a press-fit region as discussed above. In this embodiment protrusions 80 are provided between the tubes at one or more circumferentially and longitudinally spaced locations, to center the inner tube 14c within the outer tube 12c. The protrusions 80 may be designed to slightly deform upon insertion of the inner tube 14c, such that the inner tube 14c and outer tube 12c are securely assembled, and the inner tube 14c cannot move or fall out. The protrusions 80 typically would not extend the entire length nor the entire circumference of the assembly.

The tubes are further secured, and spaced, by use of a unique closure, the closure being of one or more components. The closure has a conventional stopper 84 that extends over and into the interior of the inner tube 14c, and the closure further contains a ring 86 that extends into the annular gap 60c. The ring 86 assists in securing the assembly, and also provides a seal against leakage of collected fluid into the annular gap 60c between the tubes. The stopper 84 is typically of a conventional stopper material such as rubber. The ring 86 may be of the same material as the stopper 84, but should be rigid and tough in nature to withstand forces applied during insertion of the ring 86 into the annular gap 60c. The remainder of the closure, if two piece, is likely a rigid plastic that fits snugly over the stopper.

While the present invention has been described in terms of specific embodiments, it is further contemplated that the assembly and the method of manufacturing thereof can be used with other applications.

The invention claimed is:

1. A container assembly kit comprising:
   an outer tube having a closed bottom, an open top and a side wall extending therebetween, said side wall defining an inner surface and an outer surface;
   an inner tube disposed within the outer tube and having a closed bottom, an open top and a side wall extending therebetween, the side wall of the inner tube being shorter than the side wall of the outer tube and flared outwardly adjacent the open top of the inner tube for sealing and supporting engagement with the side wall of the outer tube;
   an annular gap extending between the inner surface of the outer tube and an outer surface of the inner tube in equilibrium with atmospheric pressure at the time of assembly; and
   a removable separate spacing element positionable at the open end of the outer tube,
   wherein the annular gap is vented to atmospheric pressure during assembly of the container assembly by imparting an interference engagement between the inner tube and the outer tube adjacent the open top of the outer tube, wherein the interference engagement deforms at least one of the inner tube and the outer tube to form a venting gap that is not present after the container assembly has been assembled, wherein the interference engagement between the inner tube and the outer tube is established through the separate spacing element at the open end of the outer tube during assembly, and
   wherein at least a portion of the inner surface of the outer tube and an entire upper circumferential surface of the outer surface of the inner tube are sealingly engaged after the container assembly has been assembled.

2. The container assembly kit of claim 1, wherein the outer container is formed from a polymeric material.

3. The container assembly kit of claim 2, wherein the outer container comprises polyethylene terephthalate.

4. The container assembly kit of claim 1, wherein the inner tube is formed from a polymeric material.

5. The container assembly kit of claim 4, wherein the inner tube comprises polypropylene.

6. The container assembly kit of claim 1, wherein the spacing element includes at least one extending member extending within the open top of the outer tube during assembly.

7. The container assembly kit of claim 6, wherein the extending member of the spacing element comprises a material which is at least as hard as a material forming the outer tube.

* * * * *